(12) United States Patent
Hackler et al.

(10) Patent No.: US 10,402,784 B2
(45) Date of Patent: *Sep. 3, 2019

(54) DYNAMIC NOTARY SYSTEM

(71) Applicant: The Endustries, LLC, Oklahoma City, OK (US)

(72) Inventors: David C. Hackler, Oklahoma City, OK (US); Kenneth M. Stoner, Edmond, OK (US)

(73) Assignee: The Endustries, LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,691

(22) Filed: Mar. 2, 2018

(65) Prior Publication Data

US 2018/0225631 A1  Aug. 9, 2018

Related U.S. Application Data

(63) Continuation of application No. 13/464,774, filed on May 4, 2012, now Pat. No. 9,911,098.

(51) Int. Cl.
*G06Q 10/10* (2012.01)
*H04L 9/32* (2006.01)

(52) U.S. Cl.
CPC ........... *G06Q 10/10* (2013.01); *H04L 9/3247* (2013.01)

(58) Field of Classification Search
CPC ..... G06Q 10/10; G06Q 20/289; H04L 9/3247
USPC ........................................................ 713/178
See application file for complete search history.

(56) References Cited

U.S. PATENT DOCUMENTS

| | | | | |
|---|---|---|---|---|
| 7,660,988 | B2* | 2/2010 | Carmichael | G06Q 10/10 380/255 |
| 9,911,098 | B2* | 3/2018 | Hackler | H04L 9/3247 |
| 2002/0122564 | A1* | 9/2002 | Rhoads | G01C 11/00 382/100 |
| 2002/0143711 | A1* | 10/2002 | Nassiri | G06Q 20/3821 705/76 |
| 2003/0012374 | A1* | 1/2003 | Wu | H04L 9/3247 380/44 |
| 2005/0177750 | A1* | 8/2005 | Gasparini | G06F 21/31 726/5 |
| 2006/0177094 | A1* | 8/2006 | Smith | G06Q 10/10 382/100 |
| 2007/0280118 | A1* | 12/2007 | Takahashi | G06Q 10/087 370/241 |

(Continued)

*Primary Examiner* — Matthew T Henning
(74) *Attorney, Agent, or Firm* — Dunlap Codding, P.C.

(57) ABSTRACT

A dynamic notary system having one or more processors, and one or more non-transitory computer readable medium coupled to the one or more processors with at least one of the computer readable medium being local to the one or more processors. The one or more non-transitory computer readable medium stores computer executable instructions, that when executed by the one or more processors cause the one or more processors to: (1) verify a notary with user identification information stored on the at least one computer readable medium local to the one or more processors, (2) retrieve a document to be notarized from the one or more non-transitory computer readable medium, (3) receive a signatory's electronic signature, (4) receive the notary's electronic signature, (5) apply a notary seal to the document, and (6) lock the document in an unchangeable format.

28 Claims, 7 Drawing Sheets

(56) References Cited

U.S. PATENT DOCUMENTS

| | | | |
|---|---|---|---|
| 2008/0028455 A1* | 1/2008 | Hatter | G06F 21/305 726/10 |
| 2008/0209516 A1* | 8/2008 | Nassiri | G06F 21/32 726/3 |
| 2010/0235727 A1* | 9/2010 | Ashton | G06Q 10/10 715/253 |
| 2013/0031619 A1* | 1/2013 | Waltermann | G06F 21/305 726/8 |
| 2013/0290728 A1* | 10/2013 | Spence | H04L 9/3281 713/186 |
| 2013/0297943 A1* | 11/2013 | Hackler | H04L 9/3247 713/178 |
| 2013/0325728 A1* | 12/2013 | Bialostok | G06Q 50/18 705/311 |
| 2014/0013110 A1* | 1/2014 | Thoniel | H04L 9/083 713/156 |

* cited by examiner

OIL AND GAS LEASE

AGREEMENT, made and entered into this _____ day of __________, _____ by and between _________________________________________, of _________________________________, party of the first part, hereinafter called Lesser (whether one or more), and ______________________________; _________________________, party of the second part, hereinafter called Lessee.

WITNESSETH, that the said Lessor, for and in consideration of _____________ Dollars, cash in hand paid, and other good and valuable consideration receipt of which is hereby acknowledged and of the covenants and agreements hereinafter contained on the part of Lessee to be paid, kept and performed has granted, demised, leased, and let and by these presents does grant, demise, lease, and let unto the said Lessee, for the sole and exclusive right to explore by geophysical and other methods, for mining and operating for oil (including but not limited to distillate and condensate), gas (including casinghead gas and helium and all other constituents), and for laying pipelines, and building drill sites, access roads, tanks, power stations, electrical lines and poles, telephone lines and poles, water lines, equipment, appliances, and structures thereon, to produce save and take care of said products, all that certain tract of land, together with any reversionary rights therein, situated in the County of _______________ State of ____________________ described as follows, to wit:

and containing _________ acres, more or less.

1. It is agreed that this lease shall remain in force for a term of ____________ years (herein called primary term) and so long thereafter as oil or gas, or either of them, is produced from said land or lands pooled therewith.

2. In consideration of the premises the said Lessee covenants and agrees:

A. To deliver to the credit of Lessor free of cost, in the pipeline to which it may connect its wells, a ____________ ( / ) of the proceeds realized by Lessee from the sale thereof, less a proportionate part of

ACKNOWLEDGEMENT
   STATE OF ........................................}
                                                } ss
   COUNTY OF ......................................}

The foregoing instrument was acknowledged before me this ____ day of , __________ 20 ____, My Commission expires: __________________

Commission Number: __________________

─────────────────────────
        Signature/Notary Public
   (seal)
        ┌──────────────────────────┐ ─90
        │  ╱──╲   State of _______ │
        │ │Notary│   John Doe      │
        │ │Public│ Comm. #123456789│
        │  ╲──╱  Exp.: XXX. XX, XXXX│
        └──────────────────────────┘
```

… (omitted header) …

DYNAMIC NOTARY SYSTEM

CROSS-REFERENCE TO RELATED APPLICATIONS

This application is a continuation of U.S. Pat. No. 9,911,098, filed on May 4, 2012, the entire contents of which are hereby expressly incorporated herein by reference.

FIELD OF DISCLOSURE

The present invention relates to notarizing documents. More particularly, the present invention relates to an apparatus and product of manufacture for electronically notarizing documents after receiving document changes, while in the absence of a network connection.

BACKGROUND

Parties that execute documents as part of a transaction have historically sought out notary publics to verify the identity of the party signing a document and witness the signing of that document. This notarization of documents is traditionally performed on printed documents by a live notary public in the presence of the signatory. The inconvenience of seeking out a notary public to verify the identity and witness the signature of signatories to a document has led to remote notarization.

Remote notarization systems generally take two forms. First, remote notarization systems may employ document repositories to allow remote parties to a transaction to upload static copies of a document, which a signatory downloads and signs in the presence of a notary. Other remote notarization systems allow a notary public to verify the identity of a signatory and witness the signatory's signature across a network connection, such as the internet.

Remote notarization systems using document repositories may allow for negotiation of terms within a document and uploading of subsequent revisions agreed to by all the parties to the document. However, the terms of the document may not be changed once the document is finalized and approved for notarization. Therefore a signatory who seeks a change in the terms of the document at the time of notarization will not be allowed to negotiate and effect a change to the document. The remote notarization systems usually require a finalized version locked for notarization prior to the signatory's arrival at the notary.

Remote notarization systems enabling notaries to verify identity and witness signatures remote from the signatory may allow for ease of notarization, but require a finalized document agreed to by the parties to effect a notarization. Usually these documents are provided at the time of notarization by the signatory signing the document.

Common to these systems is the requirement that the notarization be performed on a static document to which the parties have previously agreed and finalized well in advance of notarization. Additionally, these notarization systems require an active network connection at the time of the notarization, in order for the notary to perform the notarization. These notarizations systems therefore limit the location in which notarization may occur to those areas with active network connections. These notarization systems also limit the ability to effect changes to the document where a notary may be empowered to negotiate with the signatory to the document.

Therefore, a need exists for an electronic notarization service which may accept changes to the document to be notarized at the time of notarization. A need also exists for an electronic notarization system which allows for notarization of documents in absence of the means to render the document to a print version. Further a need exists for an electronic notarization system capable of notarizing a document in absence of an active network connection.

BRIEF DESCRIPTION OF THE DRAWINGS

A more complete appreciation of the inventive concepts disclosed herein and many of the attendant advantages thereof will be readily understood by reference to the following detailed description when taken in conjunction with the accompanying drawings, in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

The inventive concepts disclosed herein are generally directed to a dynamic electronic notary system which allows a notary, registered with a notarization authority and the dynamic electronic notary system, to verify registration with locally stored or available information, retrieve a locally stored document to be notarized, receive one or more changes to the document, and notarize a document without accessing a network connection. The dynamic electronic notary system will be described hereinafter in the context of a notarization of electronic documents without accessing a network connection, but it is to be understood that the instant inventive concepts are equally applicable to notarization of all documents renderable in electronic format, as will be understood by a person of ordinary skill in the art presented with the instant disclosure.

As used herein, the terms "network-based," "cloud-based" and any variations thereof, are intended to cover the provision of configurable computational resources on demand via interfacing with a computer network, with software and/or data at least partially located on the computer network, by pooling the processing power of two or more networked processors, for example.

As used herein, the terms "comprises," "comprising," "includes," "including," "has," "having," "containing," or "involving," and variations thereof, are intended to cover a non-exclusive inclusion. For example, a process, method, article, or apparatus that comprises a list of elements is not necessarily limited to only those elements but may include other elements not expressly listed.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept(s). This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
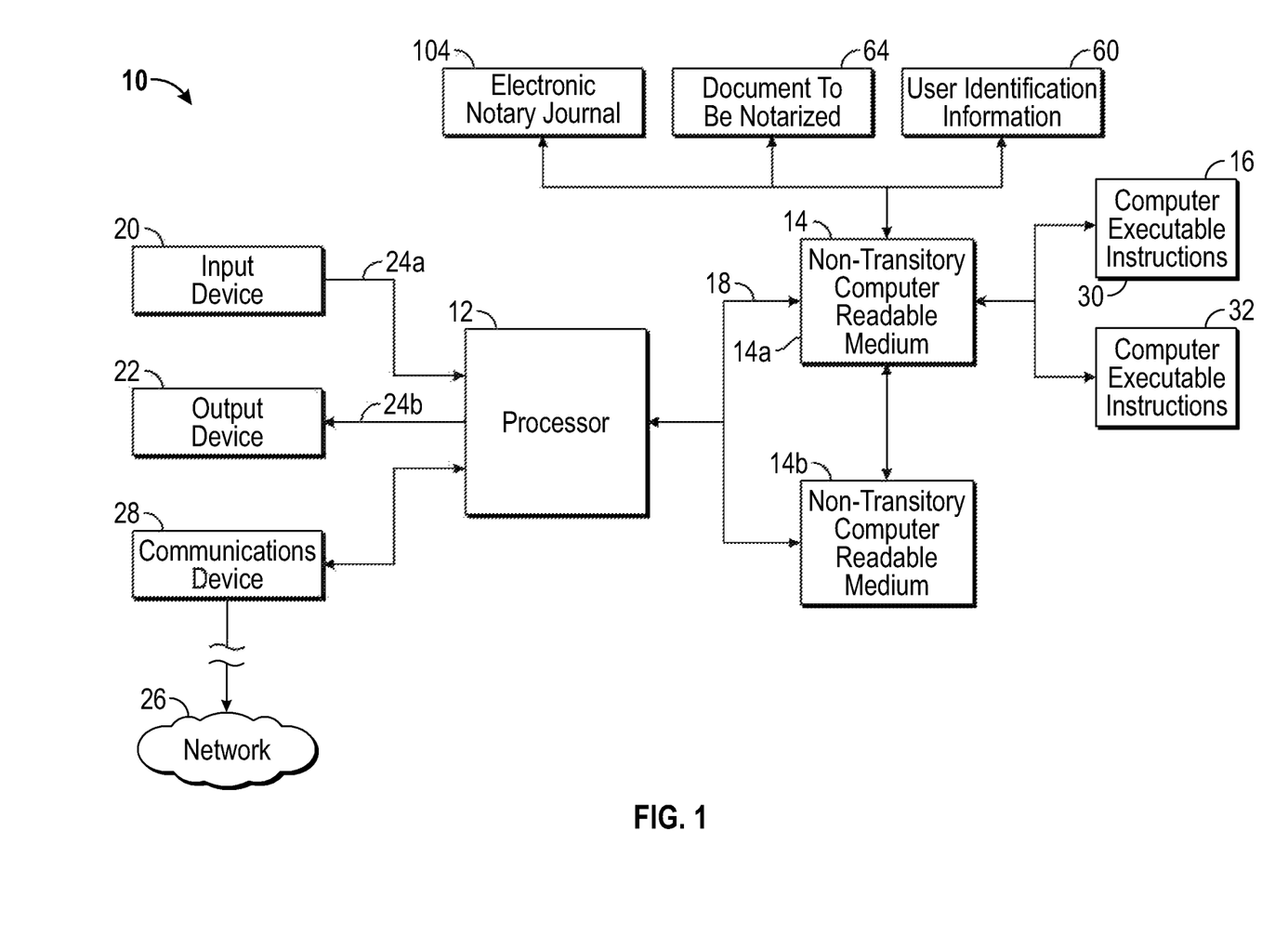
FIG. 1 is a schematic diagram of hardware and computer executable instructions constructed in accordance with the inventive concepts disclosed herein.

Referring now to FIG. 1, shown therein is a dynamic notary system 10 according to the instant disclosure. The dynamic notary system 10 comprises one or more processor 12, one or more non-transitory computer readable medium 14, and computer executable instructions 16 stored on the one or more non-transitory computer readable medium 14.

The one or more processor 12 may be implemented as a single processor 12 or multiple processors 12 working together to execute the computer executable instructions described herein. Exemplary embodiments of the one or more processor 12 include a digital signal processor (DSP), a central processing unit (CPU), a microprocessor, a multi-core processor, and combinations thereof. The one or more processor 12 is coupled to the one or more non-transitory computer readable medium 14 and capable of communicating with the one or more non-transitory computer readable medium 14 via a path 18 which can be implemented as a data bus, for example. The one or more processor 12 may be capable of communicating with an input device 20 and an output device 22 via paths 24a and 24b, respectively. Paths 24a and 24b may be implemented similarly to, or differently from path 18. For example, 24a and 24b may have a same or different number of wires and may or may not include a multidrop topology, a daisy chain topology, or one or more switched hubs. The paths 18, 24a and 24b can be a serial topology, a parallel topology, a proprietary topology, or combination thereof. The one or more processor 12 is further capable of interfacing and/or communicating with one or more networks 26, via a communications device 28 such as by exchanging electronic, digital and/or optical signals via the communications device 28 using a network protocol such as TCP/IP. It is to be understood that in certain embodiments using more than one processor 12, the one or more processor 12 may be located remotely from one another, locating in the same location, or comprising a unitary multicore processor (not shown). The one or more processor 12 is capable of reading and/or executing computer executable instructions 16 and/or creating, manipulating, altering, and storing computer data structures into the one or more non-transitory computer readable medium 14.

The one or more non-transitory computer readable medium 14 stores computer executable instructions 16 and may be implemented as any conventional non-transitory computer readable medium 14, such as random access memory (RAM), a hard drive, a hard drive array, a solid state drive, a flash drive, a memory card, a CD-ROM, a DVD-ROM, a BLU-RAY, a floppy disk, an optical drive, and combinations thereof. When more than one non-transitory computer readable medium 14 is used, one or more non-transitory computer readable medium 14a may be located in the same physical location as the one or more processor 12, and one or more non-transitory computer readable medium 14b may be located in a remote physical location from the one or more processor 12. The physical location(s) of the one or more non-transitory computer readable medium 14 can be varied, and the one or more non-transitory computer readable medium 14 may be implemented as a "cloud memory," i.e. one or more non-transitory computer readable medium 14 which is partially, or completely based on or accessed using the network 26, so long as at least one of the one or more non-transitory computer readable medium 14 is located local to the one or more processor 12.

The input device 20 transmits data to the one or more processor 12, and can be implemented as a keyboard, a mouse, a touch-screen, a camera, a cellular phone, a tablet, a smart phone, a PDA, a microphone, a network adapter, a camera, a scanner, and combinations thereof. The input device 20 may be located in the same physical location as the one or more processor 12, or may be remotely located and/or partially or completely network-based. The input device 20 communicates with the one or more processor 12 via path 24a.

The output device 22 transmits information from the one or more processor 12 to a notary, such that the information can be perceived by the notary. For example, the output device 22 may be implemented as a server, a computer monitor, a cell phone, a tablet, a speaker, a website, a PDA, a fax, a printer, a projector, a laptop monitor, and combinations thereof. The output device 22 communicates with the one or more processor 12 via the path 24b.

The network 26 preferably permits bi-directional communication of information and/or data between the one or more processor 12 and the network 26. The network 26 may interface with the one or more processor 12 in a variety of ways, such as by optical and/or electronic interfaces, and may use a plurality of network topographies and protocols, such as Ethernet, TCP/IP, circuit switched paths, and combinations thereof. For example, the network 26 may be implemented as the Internet, a local area network (LAN), a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and combinations thereof. The network 26 may use a variety of network protocols to permit bi-directional interface and communication of data and/or information between the one or more processor 12 and the network 26.

In one embodiment, the one or more processor 12, the one or more non-transitory computer readable medium 14, the input device 20, the output device 22, and the communications device 28 may also be implemented together as a smartphone, a PDA, a tablet device, such as an iPad, a netbook, a laptop computer, a desktop computer, or any other computing device.

The one or more non-transitory computer readable medium 14 preferably stores the computer executable instructions 16 comprising a dynamic notary application 30. The one or more non-transitory computer readable medium 14 may also store other computer executable instructions 32 such as an operating system and application programs such as a word processor, for example. The computer executable instructions for the dynamic notary application 30 and the other computer executable instructions 32 may be written in any suitable programming language, such as C++, C#, or Java.

Figure 2:
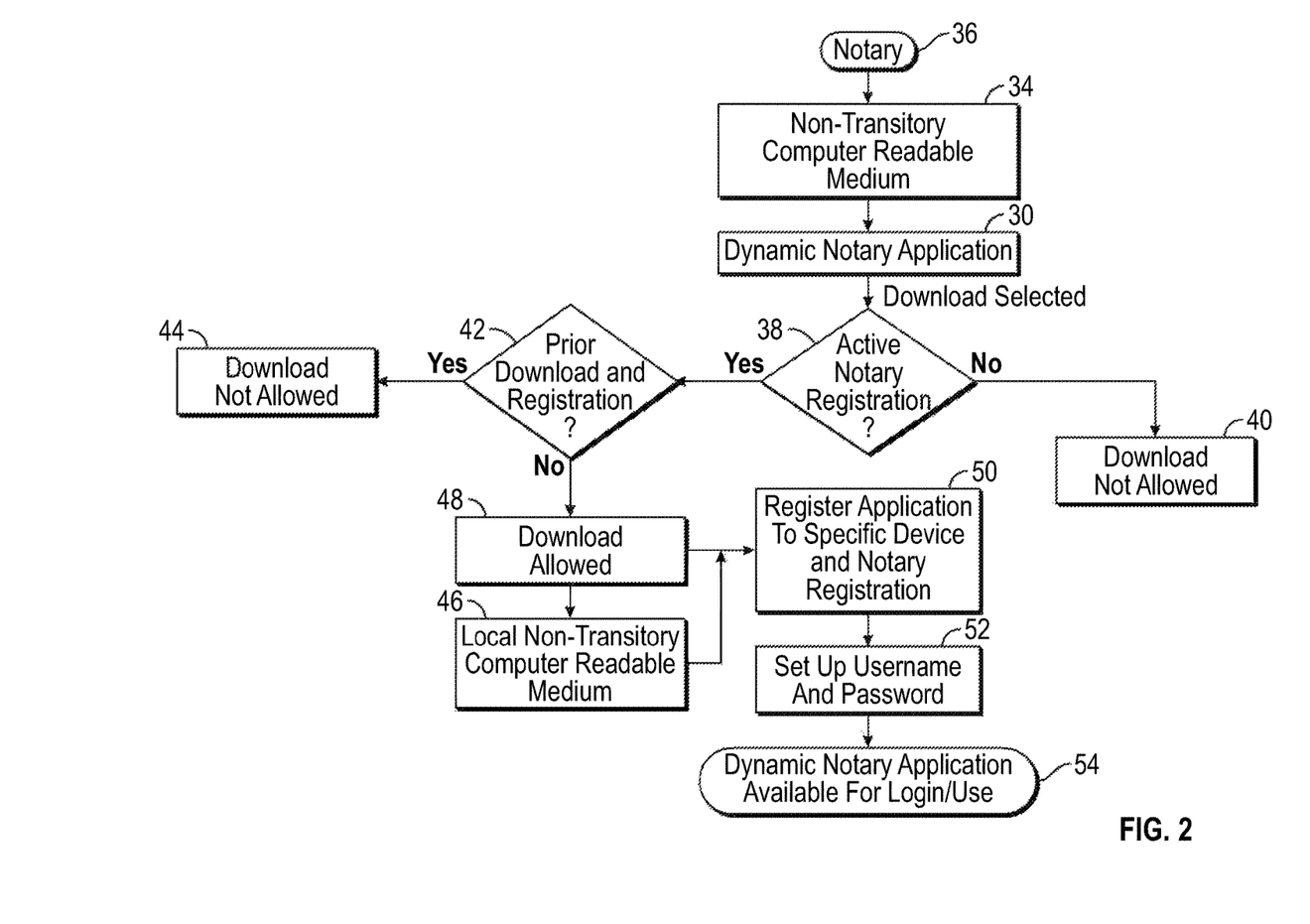
FIG. 2 is a software flow diagram of an implementation of a registration in accordance with the inventive concepts disclosed herein.

Referring now to FIG. 2, in one embodiment, the dynamic notary application 30 may reside on one or more non-transitory computer readable medium 34 apart from the one or more processor 12. The one or more non-transitory computer readable medium 34 may comprise a server accessible by website, a hard drive, a hard drive array, a solid state drive, a flash drive, a memory card, a CD-ROM, a DVD-ROM, a BLU-RAY, a floppy disk, an optical drive, and combinations thereof. In the context of one embodiment, the dynamic notary application 30 is available for download from a website that may contain various applications.

A notary 36 accessing the one or more non-transitory computer readable medium 34 selects the dynamic notary application 30 for download. The notary 36 may be directed to a notary registration prompt in a step 38. If the notary 36 does not have a valid notary registration with a federal, state, municipal, or other recognized entity, the notary 36 may be denied download of the dynamic notary application 30 in a step 40. If the notary 36 possesses a valid notary commission number with a federal, state, municipal, or other recognized entity, the notary enters the notary commission number in step 38. One or more processor (not shown) in communication with a communications network (not shown) queries a notary commission number database (not shown) for the recognized entity corresponding to the notary's 36 notary commission number for validation of the notary commission number. The notary commission number is validated by the recognized entity, as being registered to the notary 36 and being within a valid notary commission term, the notary commission term being the dates between the initial notary commission and a notary commission expiration date. If the one or more processor 12 validates the notary commission number with the recognized entity, the one or more processor 12 in communication with the one or more non-transitory computer readable medium 34 may query a database (not shown) comprising a record of notary commission numbers linked to prior downloads of the dynamic notary application 30 in a step 42. The recognized entity may also provide a card or other device to the notary with information used to locally validate the notary by the dynamic notary application 30. The information can be optically, magnetically or electronically readable. For example, the information can be in the form of a bar code, matrix (such as that disclosed in U.S. Pat. No. 5,726,435), stored on a magnetic stripe or radio frequency identification device.

If the notary commission number entered by the notary 36 in step 38 has been previously linked to a download of the dynamic notary application 30, the download may be denied in a step 44. If the notary commission number is unlinked to a dynamic notary application 30 download, the dynamic notary application 30 may be downloaded to the one or more local non-transitory computer readable medium 46 in a step 48.

The notary 36 may then enter demographic information, billing account information, shipping address, registered notary address, notary commission number in a step 50 which may create a notary profile registering the dynamic notary application 30 to the notary commission number and a computing device for the local non-transitory computer readable medium 46. The notary 36 may then be prompted to enter a desired username and password for the notary profile and for the dynamic notary application 30, in a step 52. Successful registration of the notary commission number and computing device for the local non-transitory computer readable medium 46 coupled with the notary profile may allow the notary 36 to login to the dynamic notary application 30 in a step 54, where the notary 36 may be prompted for a username and password, previously created for the notary profile and dynamic notary application 30, in order to use the dynamic notary application 30.

Figure 3:
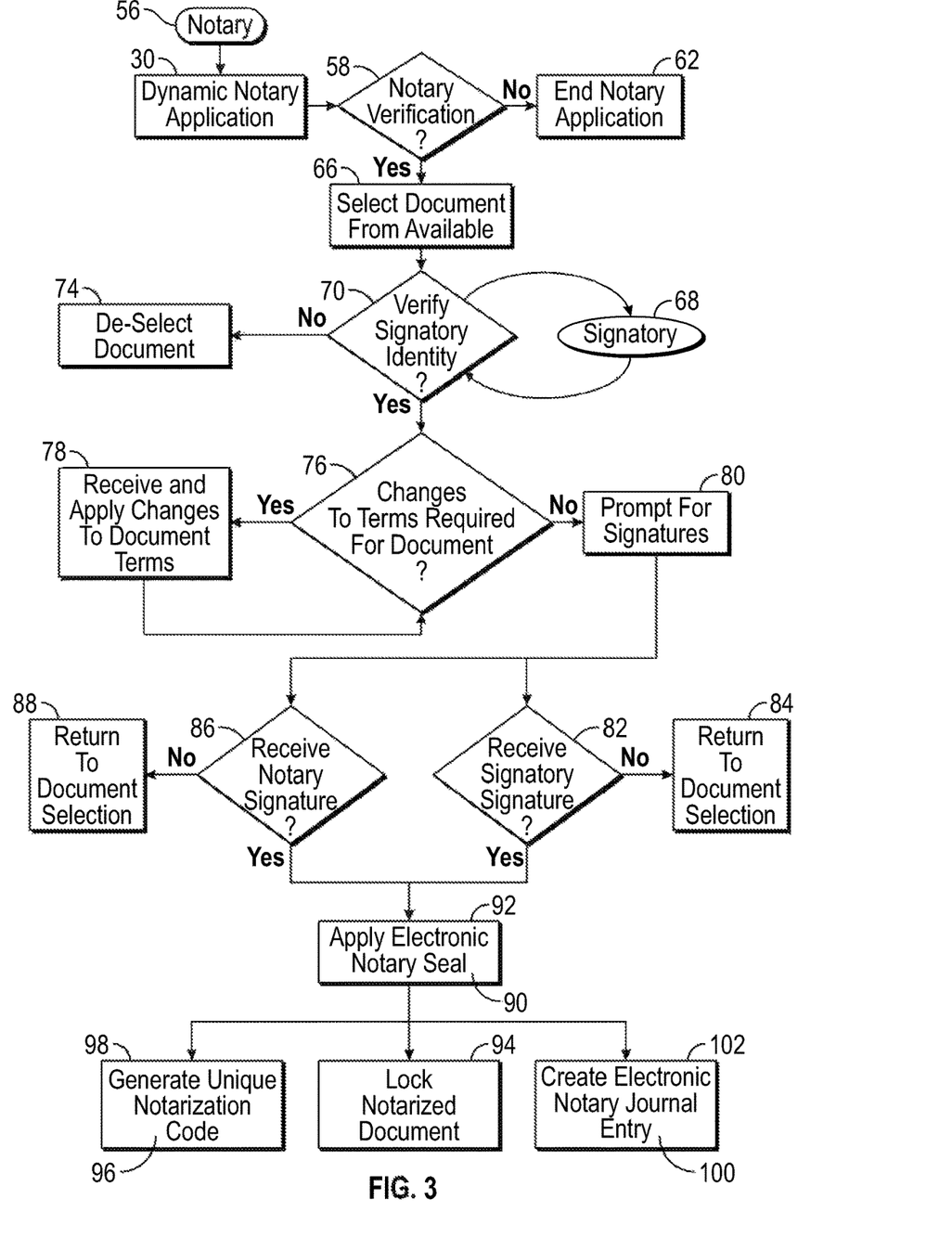
FIG. 3 is a software flow diagram of an implementation of the computer executable instructions for a notarization in accordance with the inventive concepts disclosed herein.
Figure 4:
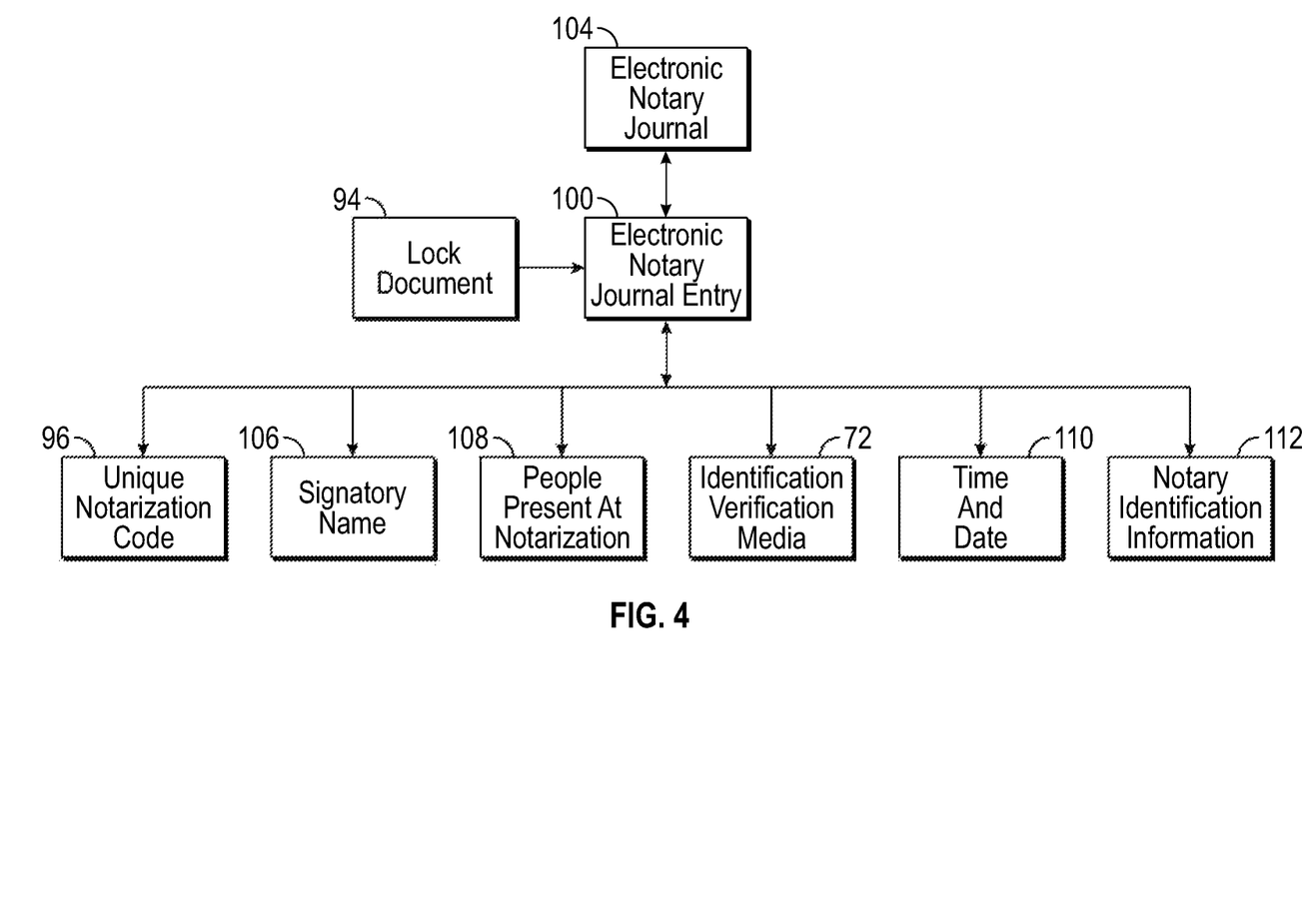
FIG. 4 is a software flow diagram of an implementation of the computer executable instructions for an electronic notary journal entry in accordance with the inventive concepts disclosed herein.

Referring now to FIGS. 1, 3, and 4, the dynamic notary application 30, in use, is accessed by a notary 56 via the one or more processor 12. The notary 56 may be directed by the one or more processor 12 to login, in a step 58. The notary 56 provides login credentials, e.g. username, password, and notary commission number. The one or more processor 12 verifies the notary 56 comparing the login credentials to user identification information 60 stored locally on the one or more non-transitory computer readable medium 14. The one or more processor 12 may verify the notary 56 without accessing the network 26 via a network connection. The user identification information 60 may comprise username and password, notary commission number for the notary 56 registered to the dynamic notary application 30, and security questions and answers, for example. If the login credentials and the locally stored user identification information 60 do not match, the dynamic notary application 30 may end, in step 62. If the login credentials match the locally stored user identification information 60, the notary 56 may access documents stored locally on the one or more non-transitory computer readable medium 14.

Upon accessing the dynamic notary application 30, the notary 56 may select a document to be notarized 64, at step 66. The document to be notarized 64 may be any document requiring notarization which is renderable in electronic format, such as a real estate contract, a land or mineral lease, or a stock certificate, for example. When the notary 56 selects the document to be notarized 64 in step 66, the one or more processor 12 retrieves the document to be notarized 64 from the one or more non-transitory computer readable medium 14. The one or more processor 12 may retrieve the document to be notarized 64 without accessing a network connection. The one or more processor 12 may then display the document to be notarized 64 on the output device 22. The one or more processor 12 may also retain the document to be notarized 64 in the one or more non-transitory computer readable medium 14 until a signatory 68 may be identified and that identity verified by the notary 56.

Once the document to be notarized 64 has been selected and retrieved in step 66, the one or more processor 12 may prompt the notary 56 to verify the identity of the signatory 68, in step 70. The identity of the signatory 68 may be verified by the notary through inspection of identification verification media 72 comprising a birth certificate, a driver's license, a military identification card, a voter registration card, a passport, a passport card, a certificate of naturalization, a certificate of citizenship, a permanent resident card, a consular report of birth abroad, a state employee identification, or a federal employee identification, for example. The notary may then capture one or more image of the identification verification media 72 with the input device 22, such as a camera or a scanner, for example, in communication with the one or more processor 12 and the one or more non-transitory computer readable medium 14. The one or more processor 12 may then store the one or more image of the identification verification 72 on the local one or more non-transitory computer readable medium 14. If the identity of the signatory 68 may not be verified, in step 70, the document to be notarized 64 is deselected by the one or more processor 12, in step 74. If the identity of the signatory 68 is verified, in step 70, the one or more processor 12 may prompt the notary 56 for any changes to the document to be notarized 64, in step 76.

The document to be notarized 64 may comprise a plurality of terms creating a contract or legally binding duty or covenant, for example. When prompted by the one or more processor 12 for one or more changes in the document to be notarized, in step 76, the notary 56 may input one or more changes to the terms of the document to be notarized 64. The one or more changes to the terms of the document to be notarized 64 may comprise corrections to errors in the document to be notarized 64, negotiated changes to amounts, terms, or duties within the document to be notarized 64, negotiated additions to the terms of the document to be notarized 64, or other modifications, additions, or deletions to the document to be notarized 64, for example. If one or more changes are made to the document to be notarized 64, the one or more processor 12 may receive the one or more changes to the document to be notarized 64 via the input device 20, such as a touchscreen, keyboard, or other input device, for example. After receiving the one or more change to the document to be notarized the one or more processor 12 may then effect the one or more changes to the document to be notarized 64, in step 78. The one or more processor 12 may then return to step 76 and prompt the notary 56 for one or more further changes to the document to be notarized 64. If one or more changes to the document to be notarized 64 are unnecessary or the one or more changes have been received by the one or more processor 12 and no more changes are necessary, the one or more processor may prompt the notary 56 for signatures, in step 80.

The one or more processor 12, prompting the notary 56 for signatures, in step 80, may prompt the notary 56 for a signatory 68 signature, in step 82. The signatory's 68 signature can be received by the input device 20 and stored electronically as data in the one or more non-transitory computer readable medium 14. For example, the signatory's 68 signature may be received through a signature pad, a touchscreen, a keyboard, a mouse, or any other input device. If the one or more processor 12 does not receive a signatory 68 signature, the one or more processor 12 may cause the dynamic notary application 30 to return, in step 84, to the document selection step 66. If the one or more processor 12 receives a signatory's 68 signature, in step 82, the one or more processor 12, may also prompt the notary 56 for the notary's 56 signature, in step 86. If the one or more processor 12 does not receive a notary's 56 signature, in step 86, the one or more processor 12 may cause the dynamic notary application 30 to return, in step 88, to the document selection step 66. If the one or more processor 12 receives a signatory 68 signature in step 82 and a notary 56 signature in step 86, the one or more processor 12 may prompt the notary 56 to apply an electronic notary seal 90, in step 92.

Figure 6A:
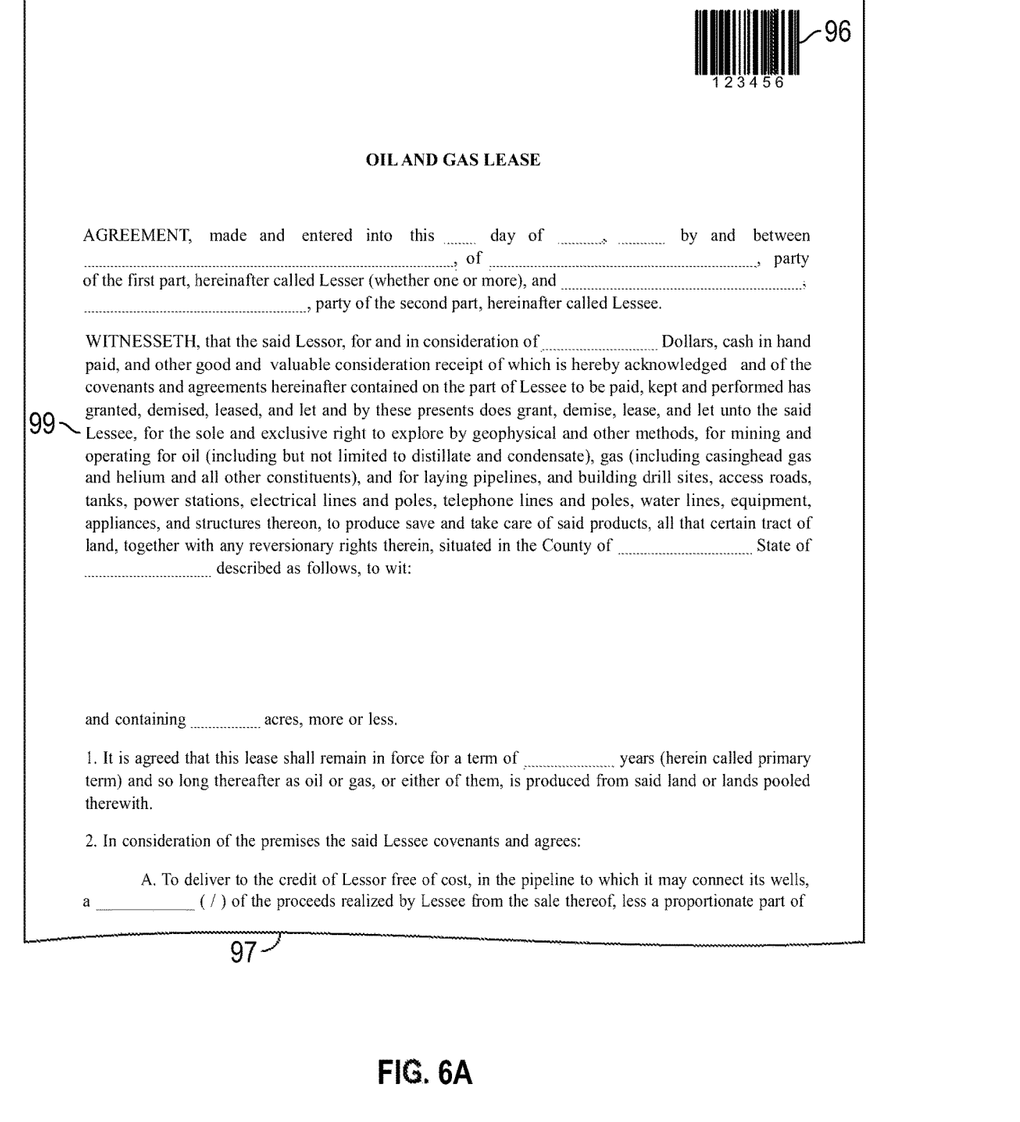
FIGS. 6A and 6B cooperate to show an example of a locked document that has been notarized in accordance with the inventive concepts disclosed herein.
Figure 6B:
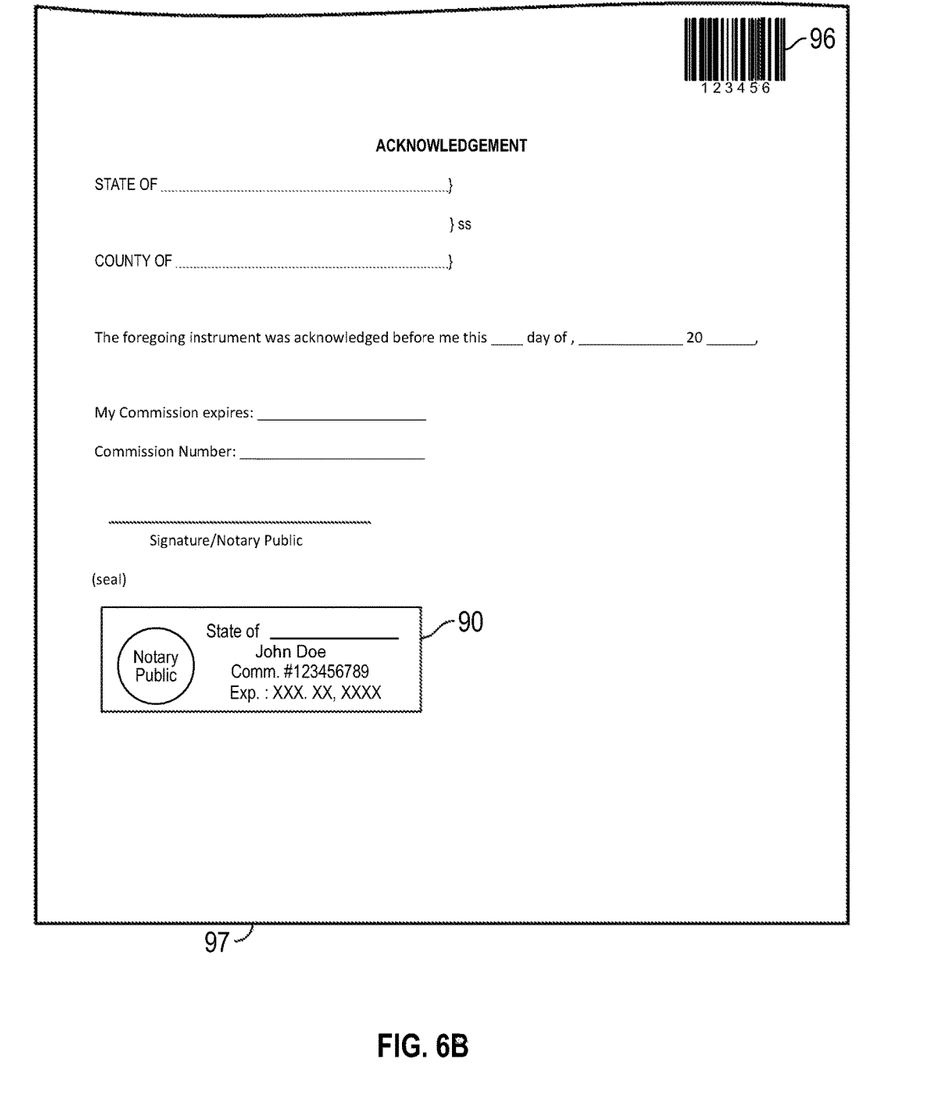

Once the one or more processor 12 prompts the notary 56 to apply the electronic notary seal 90 and the notary 56 applies the electronic notary seal 90 in step 92 to the document to be notarized 64. The document, signed and notarized by the receipt of the signatory 68 signature, notary 56 signature, and electronic notary seal 90, is notarized and may be locked by the one or more processor 12, in step 94. The notary 56 prompted by the one or more processor 12, in step 94, may select that the notarized document be locked in an unchangeable format to form a locked document 97 as depicted in FIGS. 6A and 6B. Prior to locking the notarized document in an unchangeable format, the one or more processor 12 may generate a unique notarization code 96, in step 98. Upon locking the notarized document in an unchangeable format, the one or more processor 12 may create an electronic notary journal entry 100, in step 102.

The electronic notary seal 90 serves as an electronic representation of a traditional notary seal with which notaries imprint documents to effect a notarization. The electronic notary seal 90 may comprise a graphically based seal, a linear barcode, a matrix barcode, a steganographic image, for example. The electronic notary seal 90 may contain information similar to a traditional notary seal, such as a phrase "Notary Public," the name of the notary 56 to whom the electronic notary seal belongs, the notary commission number of the notary 56 to whom the electronic notary seal 90 is issued, a notary commission number expiration date of the notary commission number of the notary 56 to whom the seal is issued, a name of a state where the notary is commissioned, for example. The electronic notary seal 90 may also comprise a time stamp indicating the time and date at which the notary seal is applied to the document to be notarized 64. Further, the electronic notary seal 90 may comprise global positioning system data indicative of a location where the document was locked. The electronic notary seal 90 may be read with an optical reader programmed with software adapted to read the information from the electronic notary seal.

Locking the notarized document, in step 94, may comprise saving the locked document 97 in a raster file, such as a bitmap, jpeg, graphics interchange format (gif), portable network graphics (PNG), or tagged image file format (TIFF) file, for example. Locking the notarized document may also comprise saving the locked document 97 as a vector file such as a computer graphics metafile (CGM) or scalable vector graphics (SVG) file, for example. Locking the notarized document may also comprise saving the document as a .pdf file. For further example, locking the notarized document may comprise taking a hash or cryptographic hash of the notarized document, or encrypting the notarized document.

Generating a unique notarization code 96, in step 98, may comprise creating a numeric code, alphanumeric code, hash, binary number series, linear barcode, matrix barcode, cryptographic key, or any other such unique code for identifying the electronic notary journal entry 100 corresponding to the notarization of the locked document 97. The unique notarization code 96 may be embedded in the notarized document prior to locking the document in an unchangeable format, in step 94. The unique notarization code 96 may also be stored in the electronic notary journal entry 100, where the unique notarization code 96 is implemented as a numeric code, alphanumeric code, hash, binary number series, linear barcode, matrix barcode, or similar code. The unique notarization code 96 may also be used to look up or search for the electronic notary journal entry 100.

A print off of an exemplary locked document 97 is depicted in FIGS. 6A and 6B. In general, the locked document 97 includes the unique notarization code 96, the electronic notary seal 90, and a body 99. The electronic notary seal 90 is shown by way of example as a graphically based notary seal and the unique notarization code 96 is shown by way of example as a barcode, but can be implemented in a variety of formats as discussed above. The body 99 can be text and/or graphics and may be in the form of a legal document such as a car title, lease, medallion signature guarantee stamp, or the like. For medallion signature guarantee stamps, the document may be certified, authenticated, and signed by, for example, an officer or employee of a financial institution, such as a bank or investment institution, instead of or along with a notary public.

The unique notarization code 96, the electronic notary seal 90 and the body 99 can all be in distinct areas, and/or overlap. For example, the unique notarization code 96 and the electronic notary seal 90 can be provided as a watermark overlaid onto the body 99.

Creating the electronic notary journal entry 100, in step 102, may comprise creating an entry in an electronic notary journal 104. The electronic notary journal entry 100 may comprise one or more fields or locations within the one or more non-transitory computer readable media 14 for the unique notarization code 96, a signatory name 106, a list of people 108 present at the time of the notarization of the document, the one or more images of the identification verification media 72, a time and date 110 indicating the time and date at which the electronic notary seal 90 is applied to the document to be notarized 64, and notary identification information 112. The notary identification information 112 may comprise a name, commission number, address, other identifying information, or any combination thereof.

Figure 5:
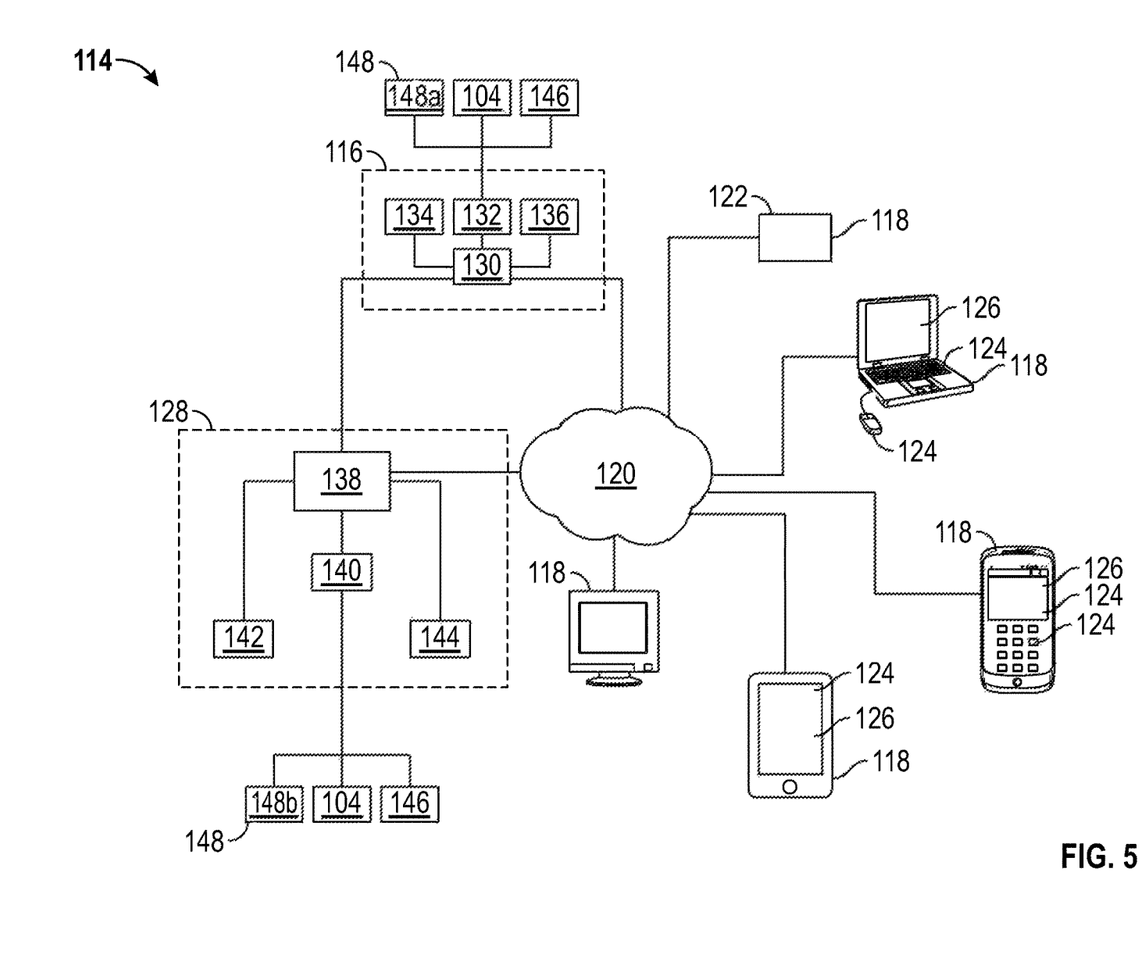
FIG. 5 is a block diagram of a computer system providing the electronic notary journal as a network-based or cloud-based service in accordance with the inventive concepts disclosed herein.

Referring now to FIGS. 4 and 5, the electronic notary journal 104 may be implemented, in one embodiment, as a "network-based" or "cloud-based" service. As shown in FIG. 5, an electronic notary journal service 114 may comprise one or more host systems 116 interfacing and/or communicating with one or more user terminal 118 via a network 120.

The one or more user terminal 118 may be implemented as a personal computer, a smart phone, network-capable television set, television set-top box, a tablet, an e-book reader, a laptop computer, a desktop computer, a network-capable handheld device, a video game console, a server, a digital video recorder, a DVD-player, a Blu-Ray player, a dynamic notary system 122, similar to the dynamic notary system 10, and combinations thereof, for example. In one embodiment, the one or more user terminal 118 may comprise an input device 124, an output device 126, a processor (not shown) capable of interfacing with the network 120, processor executable instructions (not shown), and a web browser capable of accessing a website and/or communicating information and/or data over a network, such as the network 120. As will be understood by persons of ordinary skill in the art, the one or more user terminal 118 may comprise one or more non-transitory computer readable medium comprising processor executable instructions and/or software applications, for example as described above in reference to the dynamic notary system 10.

The input device 124 may be implemented in the same or similar manner as the input device 20 described above. The input device 124 may receive input from a user and/or one or more processor, and transmitting such information to the one or more user terminal 118 and/or host system 116.

The output device 126 may be implemented in the same or similar manner as the output device 22 described above. The output device 126 may output information in a form perceivable by a user and/or one or more processor. For example, the output device 126 may be a server communicating with one or more processors which does not communicate information directly to the one or more user terminal 118, or any of the exemplary output devices described in reference to output device 22. It is to be understood that in some exemplary embodiments, the input device 124 and the output device 126 may be implemented as a single device, such as, for example, a touchscreen or a tablet. It is to be further understood that as used herein the term user is not limited to a human being, and may comprise a computer, a server, a website, a processor, a network interface, a human, a user terminal, a virtual computer, and combinations thereof.

The electronic notary journal service 114 may include one or more host systems 116. For example, FIG. 4 illustrates the electronic notary journal service 114 having two host systems 116 and 128. The host systems 116 and 128 may be partially or completely network-based or cloud-based, and not necessarily located in a single physical location. Each of the host systems 116 and 128 may further be capable of interfacing and/or communicating with the one or more user terminal 118 via the network 120, such as by exchanging signals (e.g. digital, optical, and/or the like) via one or more ports (e.g., physical or virtual) using one or more network protocols, for example. Additionally, each host system 116 and 128 may be capable of interfacing and/or communicating with other host systems directly and/or via the network 120. One of the host systems may be implemented such that it may only communicate indirectly with the one or more user terminal 118 through the other host system, for example.

In some embodiments, host systems 116 and 128 may be independently controlled by separate entities. The host system 116 may be controlled by a first entity and the host system 128 may be controlled by a second entity distinct from the first entity. For example, host system 116 may be controlled by a state or federal agency and host system 128 may be controlled by an electronic notary journal service provider. The host system 116 controlled by the state or federal agency may communicate requests for information regarding electronic notary journal information to the host system 128 controlled by the electronic notary journal service provider, who then communicates the requested information back to the state or federal agency through communication between host systems 128 and 116, respectively, for example.

The host system 116 may be referred to hereinafter as the "first host system" and the host system 128 may be referred to hereinafter as the "second host system". The first host system 116 may comprise one or more processor 130 working together, or independently to, execute processor executable instructions, one or more non-transitory computer readable medium 132 capable of storing processor executable instructions, one or more input devices 134, and one or more output devices 136. Each element of the first host system 116 may be partially or completely network-based or cloud-based, and not necessarily located in a single physical location.

The one or more processor 130 may be implemented as a single or plurality of processors 130 working together, or independently to execute the logic as described herein.

Exemplary embodiments of the one or more processor 130 may be implemented in the same or similar manner to those described above for one or more processor 12. The one or more processor 130 may be capable of communicating with the one or more non-transitory computer readable medium 132 via a path (e.g., data bus). The one or more processor 130 may be capable of communicating with the input device 134 and output device 136 via one or more paths (e.g., data bus).

The one or more processor 130 may be further capable of interfacing and/or communicating with the one or more user terminal 118 via the network 120. For example, the one or more processor 130 may be capable of communicating via the network 120 by exchanging signals (e.g., digital, optical, and/or the like) via one or more physical or virtual ports using one or more network protocol. It is to be understood that in certain embodiments using more than one processor 130, the one or more processor 130 may be located remotely from one another, located in the same location, or comprising a unitary multi-core processor (not shown). The one or more processor 130 may be capable of reading and/or executing processor executable instructions and/or of creating, manipulating, altering, and/or storing computer data structures into the one or more non-transitory computer readable medium 132.

The one or more non-transitory computer readable medium 132 may be capable of storing processor executable instructions. Additionally, the one or more non-transitory computer readable medium 132 may be implemented similarly or the same as described above in reference to the one or more non-transitory computer readable medium 14. It is to be understood that while one or more non-transitory computer readable medium 132 may be located in the same physical location as the first host system 116, the one or more non-transitory computer readable medium 132 may be located remotely from the first host system 116, and may communicate with the one or more processor 130 via the network 120. Additionally, when more than one non-transitory computer readable medium 132 is used, a first non-transitory computer readable medium 132 may be located in a remote physical location from the first host system 116. The physical location(s) of the one or more non-transitory computer readable medium 132 may be varied. Additionally, one or more non-transitory computer readable medium 132 may be implemented as a cloud memory (i.e. one or more non-transitory computer readable medium 132 may be partially or completely based on or accessed using the network 120).

The one or more input device 134 may transmit data to the one or more processor 130, and may be implemented as the input device 20, previously described in reference to the dynamic notary system 10. The one or more input device 134 may be located in the same physical location as the first host system 116, or may be remotely located and/or partially or completely network-based or cloud-based.

The one or more output devices 136 may transmit information from the one or more processor 130 to a user, such that the information may be perceived by the user. For example, the one or more output device 136 may be implemented as the output device 22, previously described in reference to the dynamic notary system 10. The one or more output device 136 may be physically co-located with the first host system 116, or may be located remotely from the first host system 116, and may be partially or completely network-based or cloud-based (e.g. website).

The first host system 116 may directly communicate with the second host system 128 and/or communicate via network 120. Generally, the first host system 116 may include one or more processors 130 capable of executing a first set of processor executable instructions and the second host system 128 may include one or more processors 138 capable of executing a second set of processor executable instructions.

The second host system 128 may further comprise one or more non-transitory computer readable medium 140, one or more input device 142, and one or more output device 144. Each element of the second host system 128 may be partially or completely network-based or cloud-based, and not necessarily located in a single physical location. The second host system 128 may be implemented in the same or similar manner as the first host system 116, previously described.

The network 120 may be implemented in the same or similar manner as the network 26, previously described in reference to the dynamic notary system 10. The network 120 may use a variety of network protocols to permit bi-directional interface and/or communication of data and/or information between the first host system 116, the second host system 128, and/or the one or more user terminals 118.

The one or more non-transitory computer readable medium 132 and 140 may store processor executable instructions and/or information comprising a one or more user database 146, one or more electronic notary journal 104, and processor executable instructions 148.

The one or more user database 146 may include information about customers engaging with the first host system 116. For example, one or more customers may access the first host system 116 through the one or more user terminal 118. The first host system 116 may provide an electronic notary journal website to the one or more user terminal 118. The electronic notary journal website may be directed by the one or more processor 130. The one or more processor 130 may also direct the one or more customer to a login/registration portion of the website.

In some embodiments, customers may register a user profile with the first host system 116. The user profile may be created and/or stored in the user database 146 by the processor 130. For example, the customer may be prompted by the processor 130 to provide login credentials (e.g., username and/or password). Login credentials may allow the processor 130 to authenticate the customer against the user database 146. In this manner, the first host system 116 may access the user profile in the user database 146. The user profile may include information including, but not limited to, demographic information including, but not limited to, name, age, address, billing account information, username, password, behavioral information, experience, gender, and/or the like.

If user authentication is successful, the user profile may be accessed by the one or more processor 130. If the user authentication fails, the customer may be returned to the login/registration page, where the customer may be prompted for a username and password again. Optionally, the one or more processor 130 may block a customer from entering a username and/or password after a preset number of failed authentication attempts.

In some embodiments, customers may be prompted by the one or more processor 130 to provide information for a user profile without registration and/or authentication using a username and/or password. The user profile may be created and/or stored in the one or more user database 146 by the one or more processor 130. For example, the one or more processor 130 may prompt the customer to provide demographic information (e.g., name, address, billing account information, and the like), and store the information in a user profile for the customer using a unique customer identification.

The electronic notary journal 104 may be stored on a public or private server, the first host system 116, or the second host system 128 in communication with the network 120 via a network connection. The electronic notary journal 104 may be accessible through the network 120 via a network connection such that a user of the electronic notary journal service 114 may access one or more electronic notary journal entry 100. One or more electronic notary journal entry 100 may be stored within the electronic notary journal 104 within the public or private server, the first host system 116, or the second host system 128. The one or more electronic notary journal entry 100 may be linked or associated with the electronic notary journal 104 within which the one or more electronic notary journal entry 100 is stored, for example, as in a relational database. The one or more electronic notary journal entry 100 may also be linked or associated with the locked document 97 for which the one or more electronic notary journal entry 100 was created. Linking or associating the locked document 97, electronic notary journal 104, and one or more electronic notary journal entry 100 may be performed by the electronic notary journal service 114.

In one embodiment, the user submits login information, registers, creates a user profile, or otherwise accesses the electronic notary journal service 114 via the network 120, as previously described. The user may register and subsequently log in as a notary or as a non-notary user. Registration and subsequent log in as a notary may provide additional functionality in the electronic notary journal service 114 when accessing one or more electronic notary journal 104 or one or more electronic notary journal entry 100.

Where the user registers as a notary, upon logging into the electronic notary journal service 114, the one or more processor 130 may present the notary with one or more webpages, screens, or display prompts, for example. The one or more processor 130 may present, in webpages, screens or display prompts, the notary's electronic notary journal 104 corresponding to their active notary commission. The one or more processor 130 may then provide functions related to the notary's electronic notary journal 104 and functions related to the electronic notary journal service 114. The functions related to the notary's electronic notary journal 104 may comprise searching the one or more electronic notary journal entry 100 of the electronic notary journal 104, viewing the one or more electronic notary journal entry 100, printing the one or more electronic notary journal entry 100, downloading a copy of the one or more electronic notary journal entry 100, or editing the one or more electronic notary journal entry 100 to add comments without modifying, changing, or deleting the information contained within the one or more electronic notary journal entry 100 populated as a result of notarizing a document, for example. The functions related to the electronic notary journal service 114 may comprise searching the one or more electronic notary journal entry 100 across a plurality of electronic notary journals 104, modifying the notary's registration information, changing the notary's password, or updating the notary's commission expiration date, for example.

When searching the electronic notary journal 104 for the one or more electronic notary journal entry 100, the notary may locate the one or more electronic notary journal entry 100 by search of the information contained within the one or more electronic notary journal entry 100 by inputting data into a text field for a search or by selecting the one or more electronic notary journal entry 100 from a graphical representation of the electronic notary journal 104, for example. The data input into the text field may comprise, for example, a unique identification number for the one or more electronic notary journal entry 100, the signatory name 106, names or identifying information for one or more of the people listed on the list of people 108 present at the time of notarization, the time and date 110, the notary identification information 112, the unique notarization code 96, or any combination thereof. Upon searching the electronic notary journal 104, the one or more processor 130 may retrieve one or more of the one or more electronic notary journal entry 100 having information matching the search query input into the text field.

Where the user registers as a non-notary, upon logging into the electronic notary journal service 114, the one or more processor 130 may present the user with functions comprising displaying the user's profile, searching one or more electronic notary journals 104, searching one or more electronic notary journal entry 100, viewing the one or more electronic notary journal entry 100, downloading a copy of the one or more electronic notary journal entry 100, modifying the user's registration information, or changing the user's password, for example. The functions related to the electronic notary journal service 114 may comprise searching one or more electronic notary journal entry 100, viewing the one or more electronic notary journal entry 100, printing the one or more electronic notary journal entry 100, downloading a copy of the one or more electronic notary journal entry 100 to one or more non-transitory computer readable medium local to the user terminal 118, accessing one or more electronic notary journal entry 100 associated with the user profile, or accessing one or more notarized document associated with the user profile. Association of one or more electronic notary journal entry 100 or one or more notarized document with a user profile may occur where the user profile is registered to the signatory of the notarized document, the user profile is registered to the agent of the signatory of the notarized document, or the user profile is registered to a party to the notarized document, for example. The functions related to the electronic notary journal service 114 may comprise searching the one or more electronic notary journal entry 100 from a plurality of electronic notary journals 104, modifying the notary's registration information, changing the notary's password, or updating the notary's commission expiration date, for example.

In one embodiment, the one or more electronic notary journal entry 100 may be cryptographically locked such that accessing the one or more electronic notary journal entry 100 requires a cryptographic key, the unique notarization code 96 generated in step 98. In another embodiment, the user may access the one or more electronic notary journal entry 100 without use of a cryptographic key. In either event, the user may access the one or more electronic notary journal entry 100 of the electronic notary journal 104, but may not modify, change, or delete the information contained within the one or more electronic notary journal entry 100.

In one embodiment, for notaries engaged in negotiation and notarization of oil and gas leases for remote properties without network access, the dynamic notary system 10 may be embodied by a tablet device, such as an iPad. A notary 56, having the dynamic notary system 10 registered to the notary's 56 valid notary commission number, may be empowered to negotiate terms of an oil and gas lease. Although the general terms of the oil and gas lease may be discussed well in advance of finalization and notarization of the lease, the notary 56 may be required to perform final negotiations with a land owner at the remote property which is the subject of the lease. The notary 56 may travel to the remote property, which may be without a network connection or wireless data services, with the dynamic notary system 10 in the form of the tablet device. The notary 56 may meet with the land owner who is the intended signatory 68 of the lease, at the remote property, which is the subject of the lease, without access to the network connection or wireless data services.

The notary 56 may use the dynamic notary system 10 to verify the notary 56 with user identification information stored on the at least one computer readable medium 14 local to the one or more processor 12 within the tablet device, as in step 58. Alternatively, the one or more processor 12 within the tablet device can be used to read a bar code, matrix (such as that disclosed in U.S. Pat. No. 5,726,435) or other information provided to the notary and within the notary's possession.

The notary 56 may then select the document to be notarized, as in step 66, causing the one or more processor 12 to retrieve the document to be notarized 64 from the one or more non-transitory computer readable medium 14 of the tablet device. The notary 56 may then verify the signatory's 68 identity with identification verification media 72, as in step 70. In verifying the identity of the signatory 68, the notary 56 may use a camera of the tablet device comprising the dynamic notary system 10 to take and store one or more images of the identification verification media 72. The one or more processor 12 then stores the one or more images of the identification verification media 72 in the one or more non-transitory computer readable medium 14.

The notary 56 may perform final negotiations regarding the terms of the lease, the document to be notarized 64, with the signatory 68. Upon completion of final negotiations and agreement to the terms, the notary 56 may make one or more changes to the document to be notarized 64, as in step 76.

Making one or more changes to the document to be notarized 64 may be effected by loading the document to be notarized 64 into a word processor program and making one or more changes or corrections to the terms of the document to be notarized 64. In another embodiment, making one or more changes to the document to be notarized 64 may be performed using the computer executable instructions comprising the dynamic notary system 10. Whether made through the word processing program or the computer executable code of the dynamic notary system 10, the one or more changes may then be applied to the document to be notarized 64.

The notary 56 may then obtain the signatory's 68 signature, as in step 82, where the signatory 68 electronically signs the document to be notarized 64 using the touchscreen of the tablet device. The notary 56 may then electronically sign the document to be notarized 64, as in step 86, using the touchscreen of the tablet device. The notary 56 may then cause the one or more processor 12 to apply the electronic notary seal 90 to the document to be notarized 64, as in step 92. The one or more processor 12 may then generate a unique notarization code 96, as in step 98. The notary 56 may then cause the one or more processor 12 to apply the unique notarization code to the notarized document and lock the notarized document, as in step 94. The one or more processor 12 may then create the electronic notary journal entry 100.

From the above description, it is clear that the inventive concepts disclosed herein are adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and spirit of the inventive concepts disclosed herein and defined by the appended claims.

What is claimed is:

1. A dynamic notary system, comprising:
   one or more processors; and
   one or more non-transitory computer readable medium coupled to the one or more processors, the one or more processors accessing a network connection to:
      query a notary commission database for a recognized entity corresponding to a notary's notary commission number for validation of the notary commission number; and
      download and install a dynamic notary application on the at least one non-transitory computer readable medium local to the one or more processors through validation of the notary's notary commission number with the recognized entity; and
      receive a document to be notarized,
      receive a signatory's electronic signature,
      receive the notary's electronic signature; and
   wherein the dynamic notary application is provided having computer executable instructions that, when executed by the one or more processors, cause the one or more processors to perform the following functions without accessing the network connection:
      verify the notary solely with user identification information stored on the at least one non-transitory computer readable medium,
      apply a notary seal to the document, and
      lock the document in an unchangeable format.

2. The dynamic notary system of claim 1, wherein the computer executable instructions, when executed by the one or more processors cause the one or more processor to receive at least one change to the document.

3. The dynamic notary system of claim 2, wherein the document includes a plurality of terms, and wherein the one of the one or more changes comprise a change to the plurality of terms of the document to be notarized.

4. The dynamic notary system of claim 1, wherein the electronic notary seal comprises a graphically based seal.

5. The dynamic notary system of claim 4, wherein the electronic notary seal is a linear barcode.

6. The dynamic notary system of claim 4, wherein the electronic notary seal is a matrix barcode.

7. The dynamic notary system of claim 4, wherein the electronic notary seal is a steganographic image.

8. The dynamic notary system of claim 4, wherein the electronic notary seal further comprises a time stamp indicating the time and date at which the notary seal is applied to the document to be notarized.

9. The dynamic notary system of claim 4, wherein the electronic notary seal further comprises global positioning system data indicative of a location where the document was locked.

10. The dynamic notary system of claim 1, wherein the computer executable instructions, when executed by the one or more processors cause the one or more processor to create an electronic notary journal entry, the electronic notary journal entry comprising data indicative of a notarization of the document.

11. The dynamic notary system of claim 10, wherein the data comprises a signatory name.

12. The dynamic notary system of claim 10, wherein the data comprises a list of people present at a time of a notarization of the document.

13. The dynamic notary system of claim 10, wherein the data comprises one or more images of one or more identification verification media, the identification verification media chosen from a list comprising, a birth certificate, a driver's license, a military identification card, a voter registration card, a passport, a passport card, a certificate of naturalization, a certificate of citizenship, a permanent resident card, a consular report of birth abroad, state employee identification, or federal employee identification.

14. The dynamic notary system of claim 10, wherein the data comprises a time and date indicating the time and date at which the notary seal is applied to the document to be notarized.

15. One or more non-transitory computer readable medium, comprising:
a dynamic notary application validated by a recognized entity using a notary commission number of a notary prior to being installed on the non-transitory computer readable medium and available for use by the notary, the dynamic notary application having computer executable instructions that, when executed by one or more processors, cause the one or more processors to receive a signatory's electronic signature, and a notary's electronic signature for a document to be notarized from a network connection, and perform the following functions without accessing the network connection:
verify the notary with user identification information stored on the one or more non-transitory computer readable medium;
apply an electronic notary seal to the document; and
lock the document in an unchangeable format.

16. The one or more non-transitory computer readable medium of claim 15, wherein the computer executable instructions further comprise receiving at least one change to the document to be notarized.

17. The one or more non-transitory computer readable medium of claim 16, wherein the document includes a plurality of terms, and wherein the change is made to one or more terms of the document to be notarized.

18. The one or more non-transitory computer readable medium of claim 15, wherein the electronic notary seal comprises a graphically based seal.

19. The one or more non-transitory computer readable medium of claim 18, wherein the electronic notary seal is a linear barcode.

20. The one or more non-transitory computer readable medium of claim 18, wherein the electronic notary seal is a matrix barcode.

21. The one or more non-transitory computer readable medium of claim 18, wherein the electronic notary seal comprises a steganographic image.

22. The one or more non-transitory computer readable medium of claim 18, wherein the electronic notary seal further comprises a time stamp indicating the time and date at which the notary seal is applied to the document to be notarized.

23. The one or more non-transitory computer readable medium of claim 18, wherein the electronic notary seal further comprises global positioning system data indicative of a location where the document was locked.

24. The one or more non-transitory computer readable medium of claim 15, wherein locking the document in an unchangeable format, further comprises creating an electronic notary journal entry, the electronic notary journal entry comprising data indicative of a notarization of the document.

25. The one or more non-transitory computer readable medium of claim 24, wherein the data comprises a signatory name.

26. The one or more non-transitory computer readable medium claim 24, wherein the data comprises a list of people present at a time of a notarization of the document.

27. The one or more non-transitory computer readable medium of claim 24, wherein the data comprises one or more images of one or more identification verification media, the identification verification media chosen from a list comprising, a birth certificate, a driver's license, a military identification card, a voter registration card, a passport, a passport card, a certificate of naturalization, a certificate of citizenship, a permanent resident card, a consular report of birth abroad, state employee identification, or federal employee identification.

28. The one or more non-transitory computer readable medium of claim 24, wherein the data comprises a time and date indicating the time and date at which the notary seal is applied to the document to be notarized.

* * * * *